(12) United States Patent
Eley et al.

(10) Patent No.: US 12,416,382 B2
(45) Date of Patent: Sep. 16, 2025

(54) FROST RESISTANT HOSE FITTING

(71) Applicant: Eley Corporation, Reno, NV (US)

(72) Inventors: Craig D. Eley, Reno, NV (US); Darin Schollmeyer, Creighton, NE (US); Kyle Eley, Washoe Valley, NV (US)

(73) Assignee: ELEY CORPORATION, Reno, NV (US)

( * ) Notice: Subject to any disclaimer, the term of this patent is extended or adjusted under 35 U.S.C. 154(b) by 50 days.

(21) Appl. No.: 18/385,290

(22) Filed: Oct. 30, 2023

(65) Prior Publication Data
US 2025/0137570 A1 May 1, 2025

(51) Int. Cl.
F16L 57/02 (2006.01)
F16L 27/08 (2006.01)

(52) U.S. Cl.
CPC ........... F16L 57/02 (2013.01); F16L 27/0849 (2013.01)

(58) Field of Classification Search
CPC ............................... F16L 57/02; F16L 27/0849
See application file for complete search history.

(56) References Cited

U.S. PATENT DOCUMENTS

| | | | | |
|---|---|---|---|---|
| 2,954,989 A * | 10/1960 | Burns | ..................... | B64D 10/00 285/224 |
| 4,697,614 A * | 10/1987 | Powers | ..................... | F24D 17/00 126/362.1 |
| 5,277,226 A * | 1/1994 | Kuhlman | ................ | E03C 1/023 285/354 |
| 6,295,918 B1 * | 10/2001 | Simmons | ................ | F04B 43/02 92/98 R |
| 2002/0134430 A1 * | 9/2002 | Babcock | ............... | F16L 55/134 137/315.01 |
| 2019/0271285 A1 * | 9/2019 | Benanti | .................. | F16L 55/053 |
| 2023/0128634 A1 * | 4/2023 | Mason | .................. | F16K 11/087 237/66 |

* cited by examiner

Primary Examiner — Patrick C Williams
(74) Attorney, Agent, or Firm — Davis Graham & Stubbs LLP

(57) ABSTRACT

A hose fitting includes a fitting body, having an inlet opening, an expansion opening, and an outlet opening. An expansion disc is coupled with the expansion opening and is formed from a deformably resilient material. A portion of the expansion disc expands outwardly from the fitting body, when pressure within the fitting body increases, increasing a volume of the fitting body. The expansion disc contracts, as the pressure within the fitting body reduces. The expansion disc may be removably coupled with the expansion opening using an expansion nut, having an open center portion.

15 Claims, 8 Drawing Sheets

FROST RESISTANT HOSE FITTING

BACKGROUND

Residential and commercial hose assemblies, which include hoses and one or more hose fittings, are frequently coupled with exterior water supplies. Sometimes the hose assembly is coupled with the water supply by a splitter valve. Other times the hose assembly includes a hose reel, having a hose swivel. All too frequently, such hose assemblies are left coupled with the water supplies at times of the year that experience freezing temperatures. Where water remains in the hose assembly, and attached hose fitting, the water will cycle between liquid and frozen states. As the water begins to freeze, it expands. This increases the pressure within the rigid hose fitting, which can cause the hose fitting to rupture.

A ruptured hose fitting can be costly. Not only is the hose fitting ruined but, when left unchecked, the ice will melt, allowing water to flow freely through the ruptured hose fitting. The free-flowing water can cause water damage to adjacent property, not to mention the loss of water that will show up on a water bill at the end of the month. Accordingly, what is needed is a hose fitting that can accommodate the expansion and contraction of freezing water without permanently damaging the hose fitting.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides a hose fitting that includes a fitting body, having an inlet opening, an expansion opening, an outlet opening, and an interior portion that defines a fluid pathway. The fluid pathway extends between, and in fluid communication with, the inlet opening, expansion opening, and the outlet opening. An expansion disc is operatively coupled with the expansion opening. The expansion disc is formed from a deformably resilient material that, as a pressure within the fluid pathway increases from a base pressure, a portion of the expansion disc expands outwardly from the fitting body, increasing a volume of the fluid pathway from a base volume. The expansion disc contracts, as the pressure within the fluid pathway reduces toward the base pressure, reducing the volume of the fluid pathway toward the base volume. In particular embodiments, the expansion disc is formed from an elastomeric material.

In various embodiments, the expansion disc is removably coupled with the expansion opening. In some such embodiments, an expansion nut is removably coupled with the expansion opening such that the expansion disc is secured between the expansion opening and the expansion nut. The expansion nut, in particular embodiments, has an open central portion that is shaped to allow a portion of the expansion disc to expand into and at least partially through the open central portion.

In various embodiments the hose fitting is a splitter valve, having a pair of valves that are operatively coupled with the fitting body and disposed within the fluid pathway. In other embodiments, the hose fitting is a hose swivel that is part of a hose reel assembly. In such embodiments, the expansion disc is formed from an elastomeric material that will expand outwardly from the expansion opening at pressures that are lower than a failure pressure rating of the swivel connector. It is contemplated that nearly any rigid hose fitting can be adapted to include the expansion opening and removable, or permanently disposed, expansion disc assembly.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
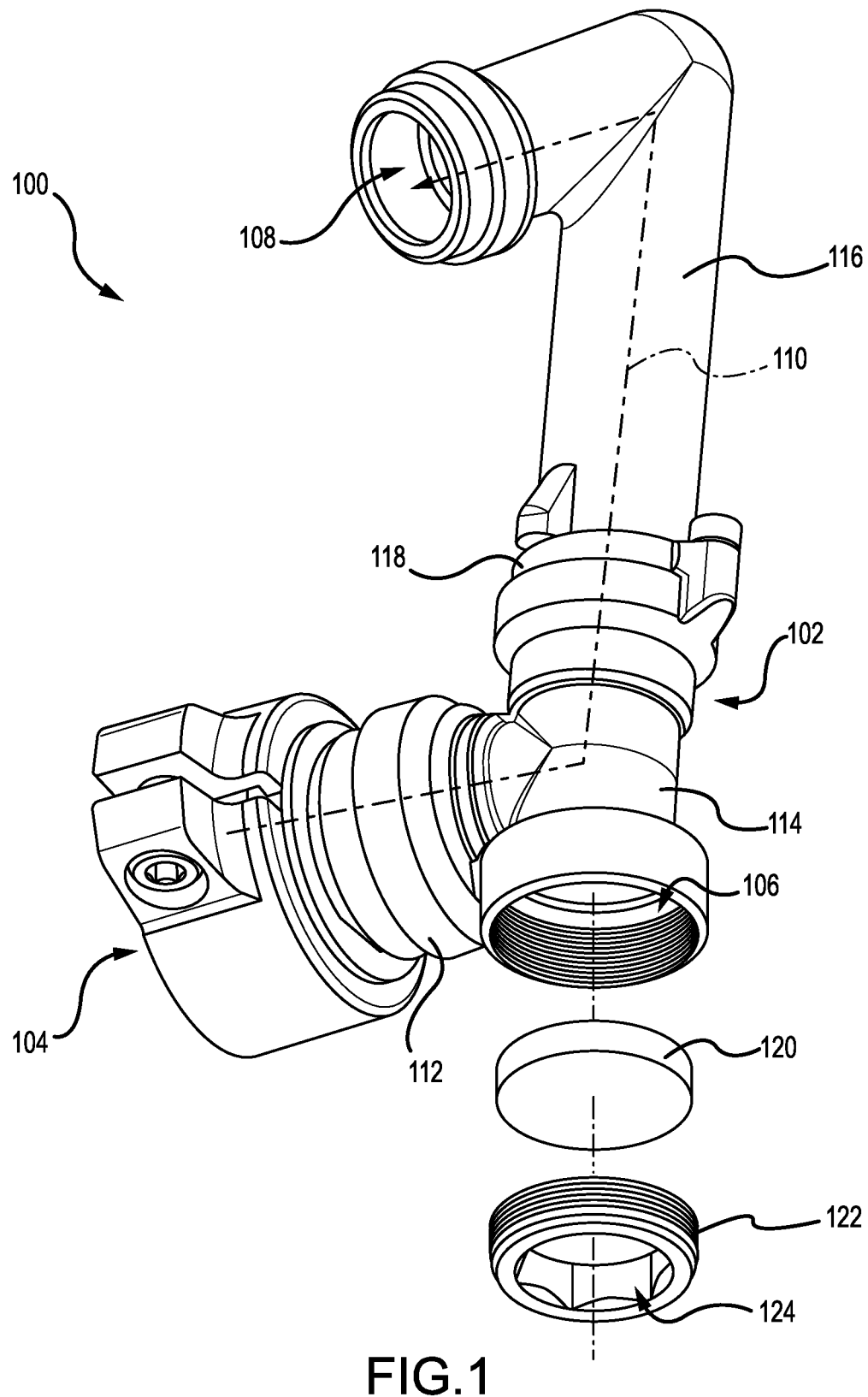
FIG. 1 depicts a partially exploded, perspective view of a hose swivel fitting that incorporates one embodiment of the frost resistant features of the present technology.
Figure 2A:
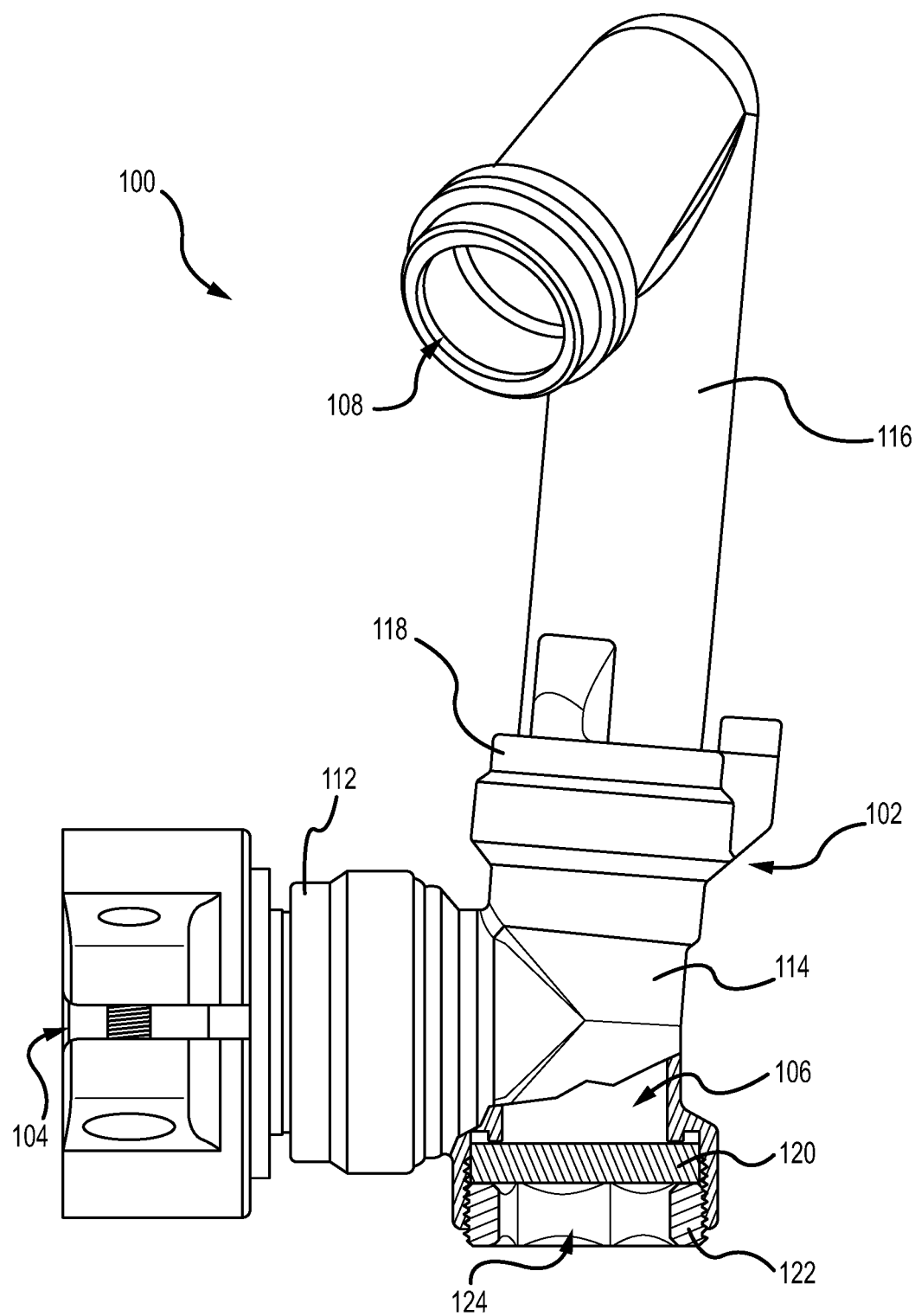
FIG. 2A depicts a partially cut-away, side elevation view of the hose swivel fitting of FIG. 1 with the expansion disc in an unexpanded state.
Figure 2B:
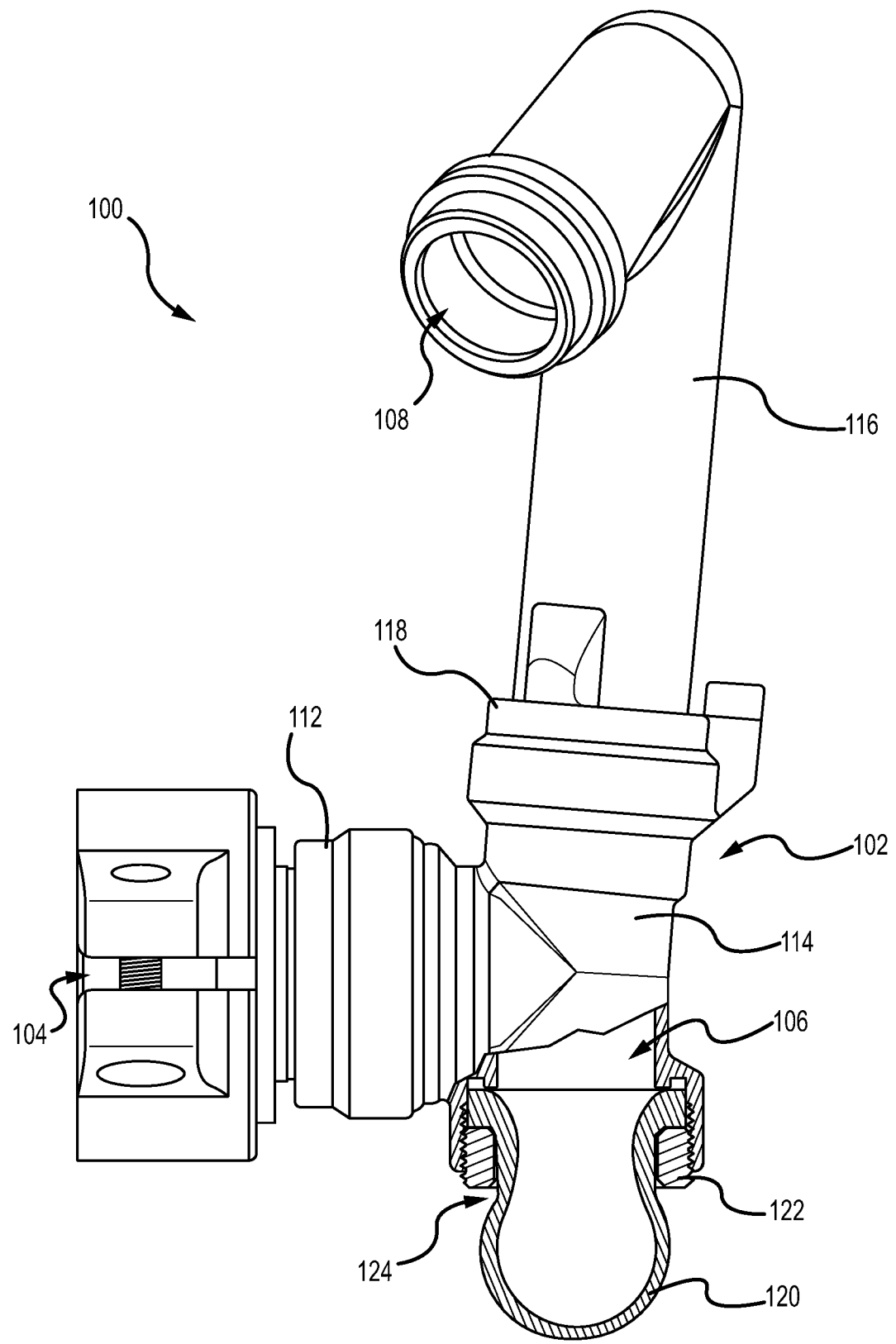
FIG. 2B depicts a partially cut-away, side elevation view of the hose swivel fitting of FIG. 1 with the expansion disc in an expanded state.
Figure 3:
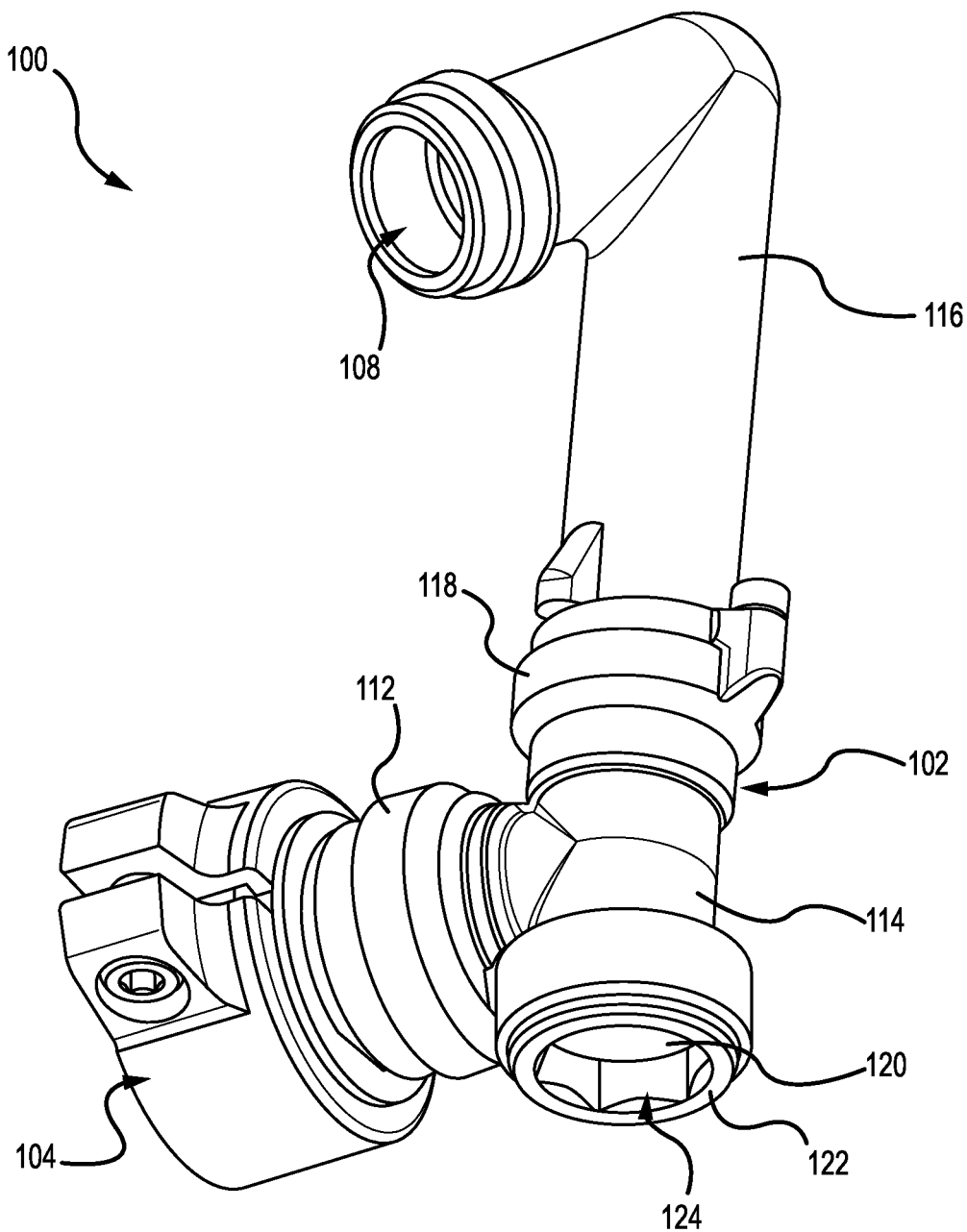
FIG. 3 depicts a lower, perspective view of the hose swivel fitting of FIG. 1.
Figure 4:
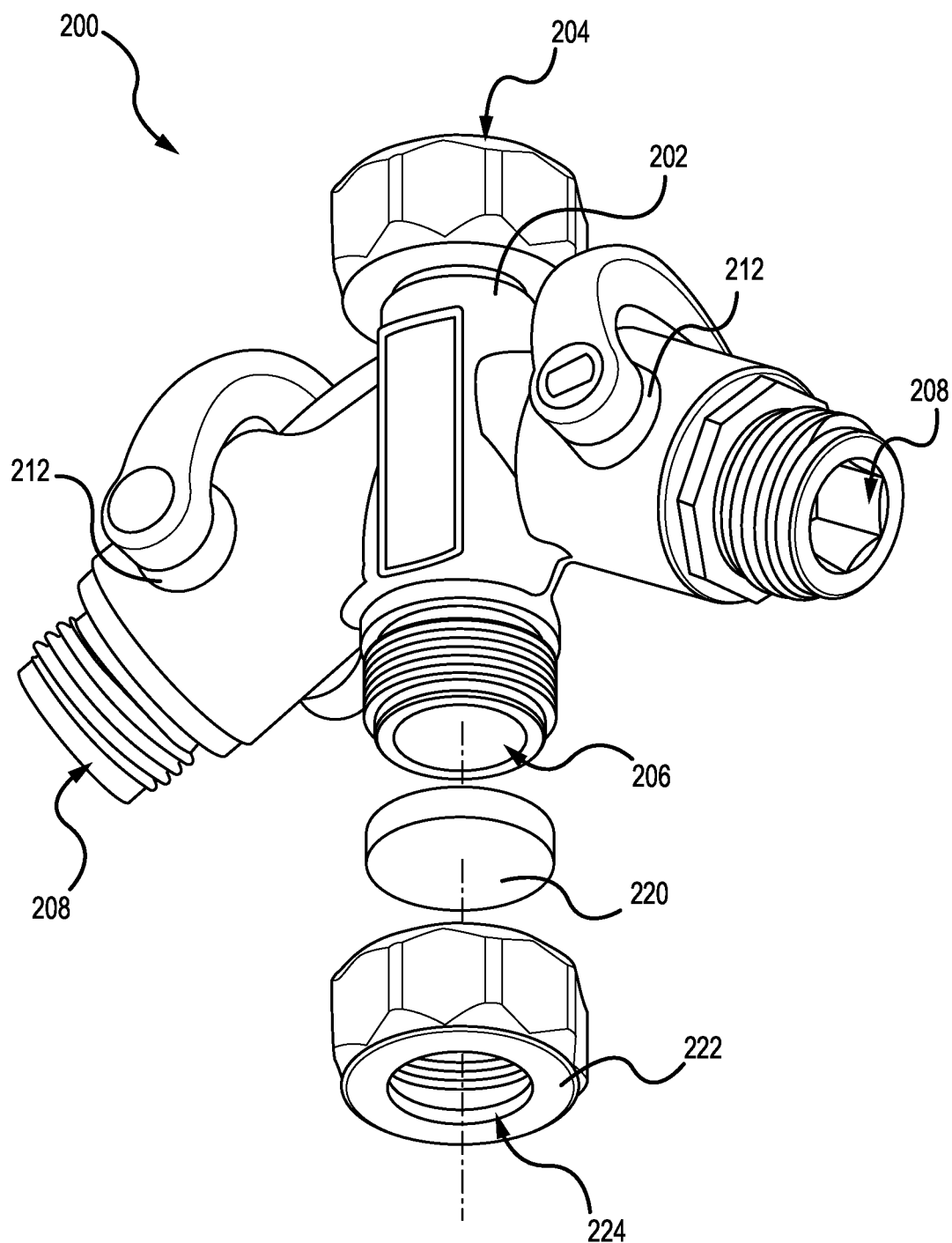
FIG. 4 depicts a partially exploded, perspective view of a splitter valve fitting that incorporates another embodiment of the frost resistant features of the present technology.
Figure 5A:
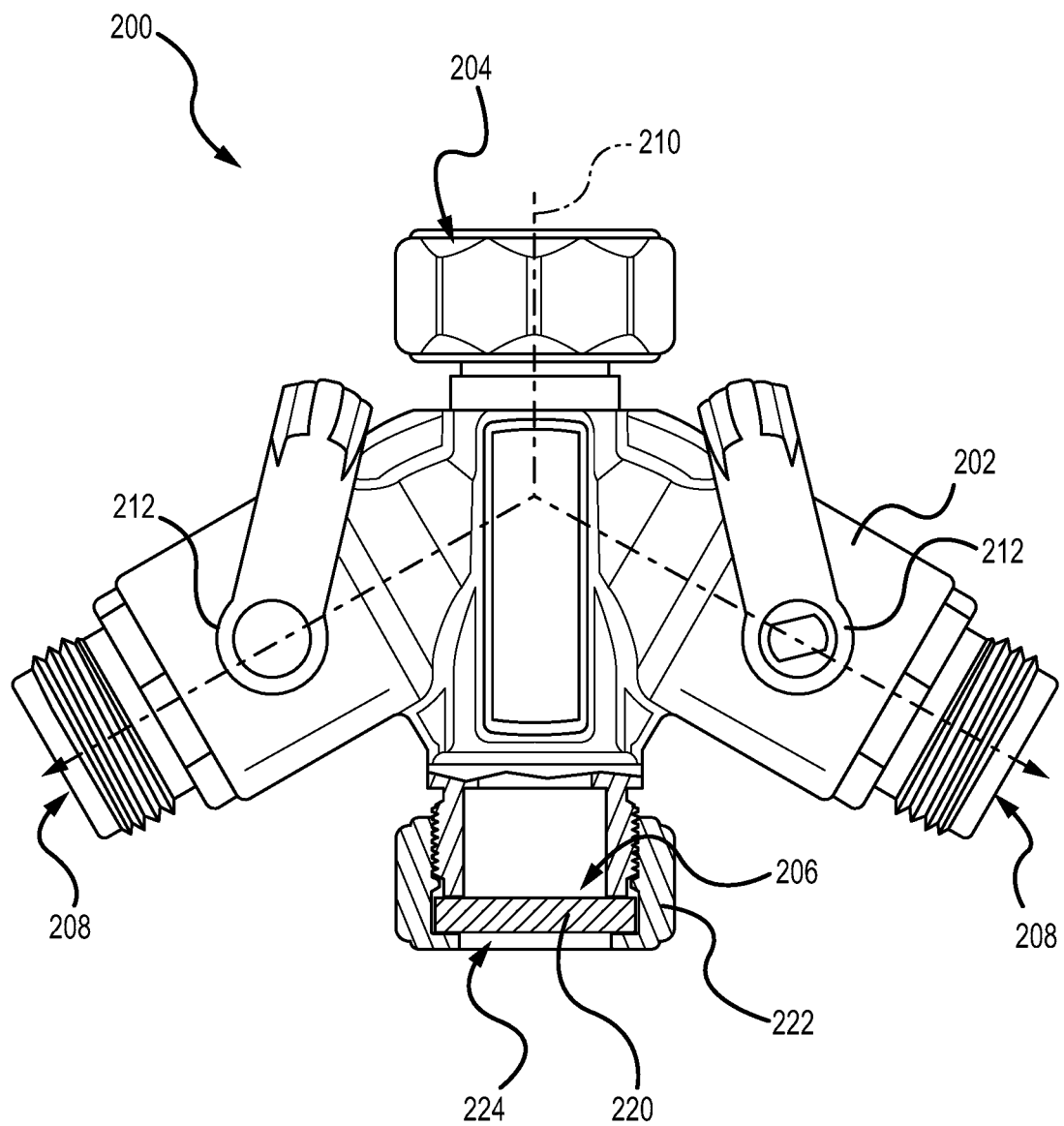
FIG. 5A depicts a partially cut-away, side elevation view of the splitter valve fitting of FIG. 4 with the expansion disc in an unexpanded state.
Figure 5B:
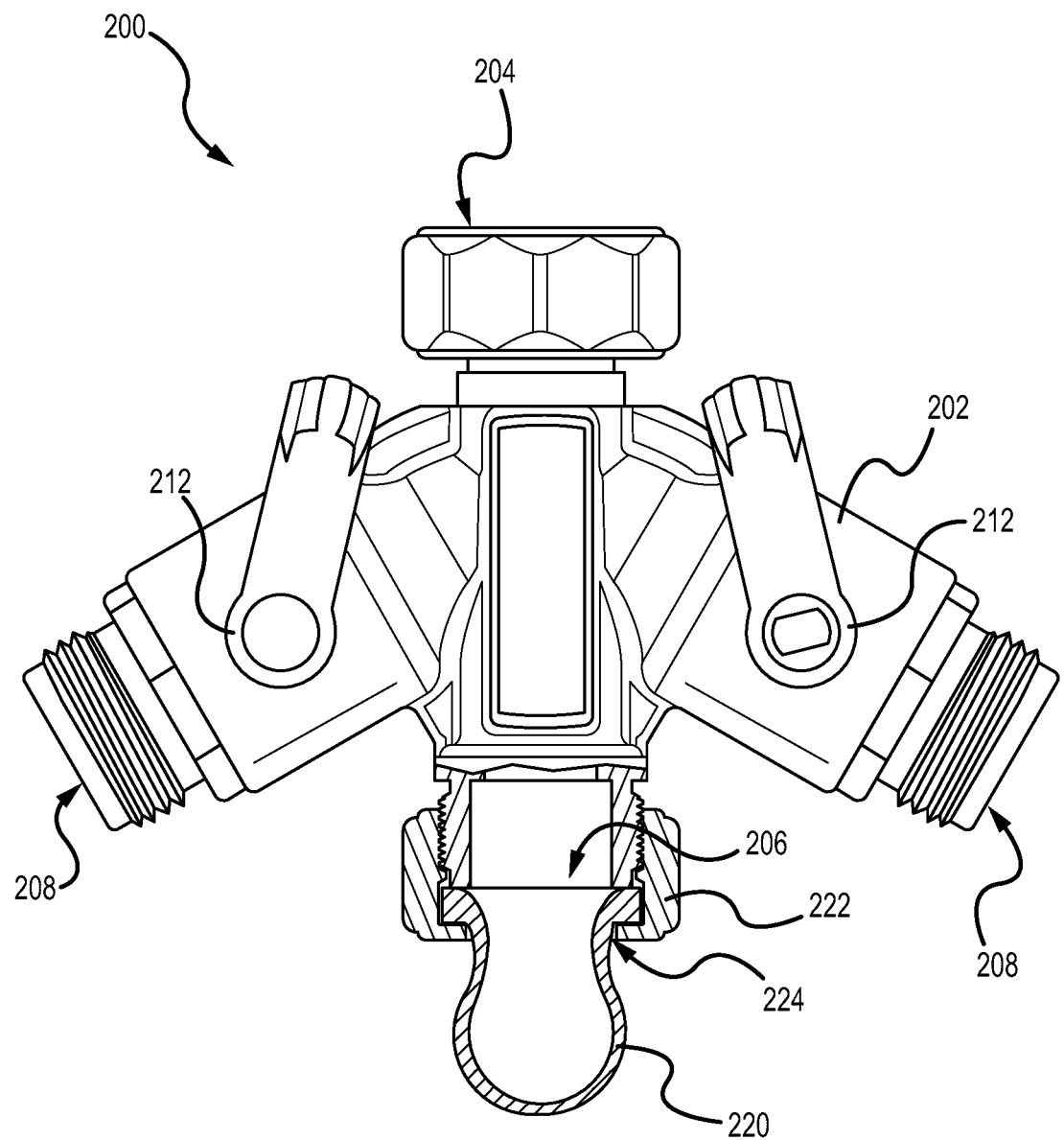
FIG. 5B depicts a partially cut-away, side elevation view of the splitter valve fitting of FIG. 4 with the expansion disc in an expanded state.
Figure 6:
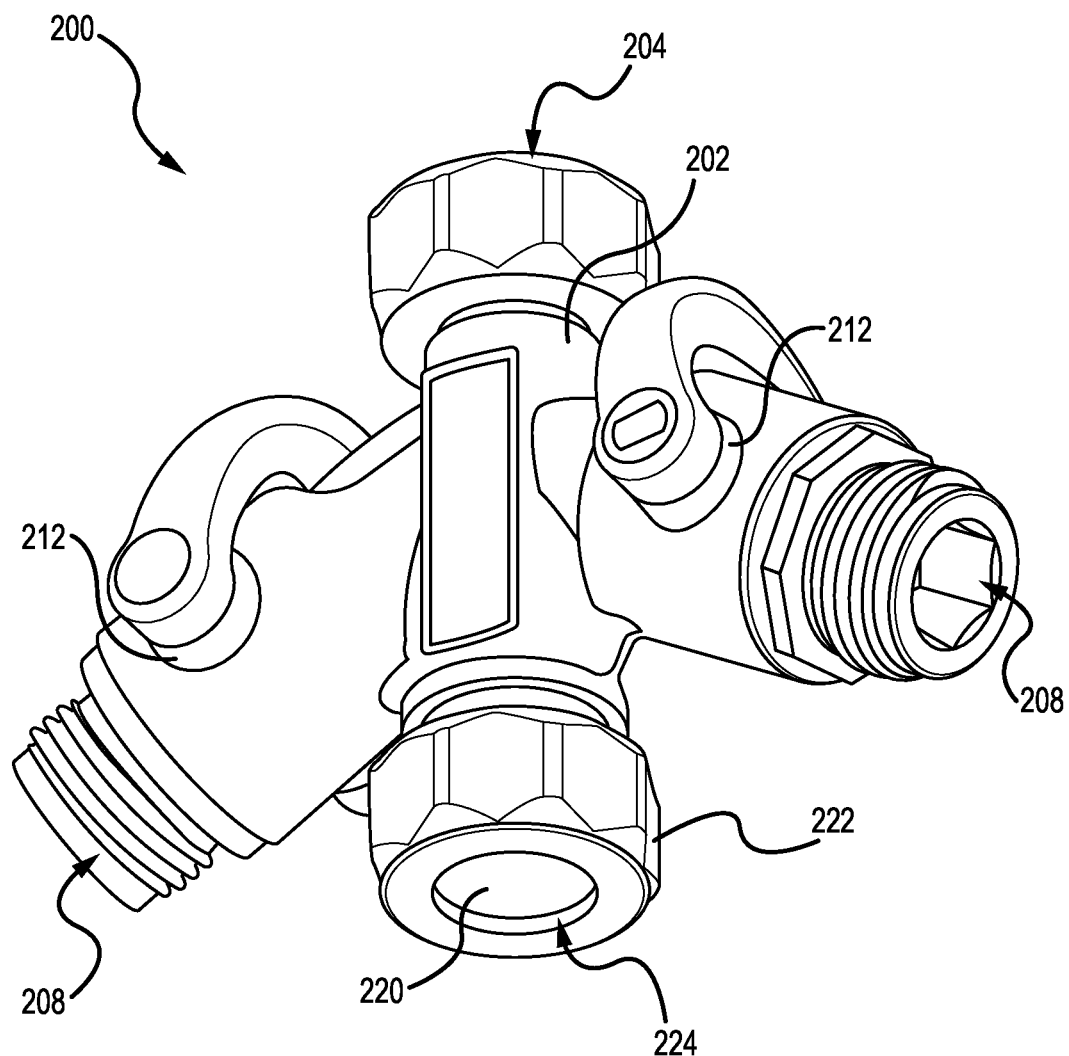
FIG. 6 depicts a lower, perspective view of the splitter valve fitting of FIG. 4.

Aspects of the present technology, depicted in FIGS. 1-6, provide frost resistant hose fittings. The technology is adaptable for use in nearly any hose fitting that is used in environments having a range of temperatures and, in particular, freezing temperatures. In various embodiments, the present technology is incorporated within hose assemblies that handle and distribute water, such as residential garden hose assemblies. With reference to FIGS. 1-3, the hose assembly may include a hose reel, having a hose swivel 100, which allows lengths of hose to be wound onto the hose reel while remaining coupled to a fixed-position water source. For simplicity, only the hose swivel 100 is depicted. With reference to FIGS. 4-6, the hose assembly may be coupled with a water supply by a splitter valve 200, which allows multiple lengths of hose to be coupled with a single water supply. Again, for simplicity, only the splitter valve 200 is depicted. It will be appreciated, however, by those of skill in the art, that the present technology may be applied, in various ways, to a variety of different hose fittings without departing from the scope of the present technology.

With further reference to FIGS. 1-3, a hose swivel 100 is depicted and includes a fitting body 102 having an inlet opening 104, an expansion opening 106, an outlet opening 108, and an interior portion that defines a fluid pathway 110, which extends between and in fluid communication with the inlet opening 104, expansion opening 106, and the outlet opening 108. The fitting body 102 is formed from a rigid material. In particular embodiments, the fitting body 102 is formed from a metal, such as brass. The inlet opening is associated, generally, with a reel swivel 112 that would be operatively coupled with a water supply line (not depicted). The reel swivel 112 is rotatably coupled with swivel body 114. In various embodiments, the expansion opening 106 is associated with the swivel body 114. The swivel body 114 is rotatably coupled with elbow 116 by swivel connector 118.

A deformably resilient expansion disc 120 is operatively coupled with the expansion opening 106. In various embodiments, the expansion disc 120 is a removable component of the hose swivel 100. In such embodiments, the expansion disc 120 may simply be placed against the expansion opening 106 and secured in position using an expansion nut 122. In particular embodiments, the expansion nut 122 is secured with the swivel body 114 using mating threads. In other embodiments, the expansion nut 122 may be press fit with the swivel body 114, over the expansion opening 106. In still other embodiments, the expansion disc 120 and the expansion nut 122 could be formed together, such as through insert molding.

It is contemplated that, with use, the hose swivel 100 will fill with water (or other liquid), which will remain within the fitting body 102 when the hose swivel 100 is no longer being used. In such instances, the ambient temperature around the hose swivel 100 may fall below freezing. It should be appreciated that water, and other liquids, expand as they freeze. Within a closed hose swivel 100 (where liquid is not entering or leaving the hose swivel 100) the pressure within the fitting body 102 will increase as the liquid expands. The deformably resilient nature of the expansion disc 120 allows a portion of the expansion disc 120 to expand outwardly from the fitting body 102 (depicted in FIG. 2B) increasing a volume of the fluid pathway 110 from a base volume as a pressure within the fluid pathway increases from a base pressure. Accordingly, portions of the expanding, freezing liquid will fill the increased volume of the fluid pathway 110. Likewise, as the liquid melts, the expansion disc 120 contracts to a resting state (depicted in FIG. 2A) as the pressure within the fluid pathway 110 reduces toward the base pressure, reducing the volume of the fluid pathway 110 toward the base volume. It is contemplated that the expansion disc 120 could be formed from an elastomeric material that provides the desired level of deformable resiliency and structural integrity. In at least one embodiment, the expansion disc is formed from Polyurethane and is generally circular in shape, having a diameter of 1 inch and a thickness of 0.18 inches. In order to better accommodate the expansion of the expansion disc 120, the expansion nut 122 may be provided with an open central portion 124. The open central portion 124 is generally shaped to allow a portion of the expansion disc 120 to expand into, and at least partially through, the open central portion 124. In various embodiments, the expansion nut 122 is formed from a rigid material. In particular embodiments, the expansion nut 122 is formed from a metal, such as brass.

It is contemplated that the expansion disc 120 will form the "weak link" of the hose swivel 100. Accordingly, in particular embodiments, the expansion disc 120 is formed from an elastomeric material that will expand outwardly from the expansion opening 106 at pressures that are lower than a failure pressure rating of the reel swivel 112 or the swivel connector 118. For example, embodiments of the reel swivel 112 and the swivel connector 118 may have a failure pressure rating of between 800 psi and 1000 psi. However, testing has shown that embodiments of the expansion disc 120 failed at a pressure range of between 500 psi and 600 psi.

With further reference to FIGS. 4-6, a splitter valve 200 is depicted and includes a fitting body 202 having an inlet opening 204, an expansion opening 206, a pair of outlet openings 208, and an interior portion that defines a fluid pathway 210, which extends between and in fluid communication with the inlet opening 204, expansion opening 206, and the outlet openings 208. The fitting body 202 is formed from a rigid material. In particular embodiments, the fitting body 202 is formed from a metal, such as brass. In various embodiments, the outlet openings 208 are associated, generally, with a valve 212 that selectively restricts and permits liquid flow from the respective outlet openings 208.

A deformably resilient expansion disc 220 is operatively coupled with the expansion opening 206. In various embodiments, the expansion disc 220 is a removable component of the splitter valve 200. In such embodiments, the expansion disc 220 may simply be placed against the expansion opening 206 and secured in position using an expansion nut 222. In particular embodiments, the expansion nut 222 is secured with the fitting body 202 using mating threads. In other embodiments, the expansion nut 222 may be press fit with the fitting body 202, over the expansion opening 206. In still other embodiments, the expansion disc 220 and the expansion nut 222 could be formed together, such as through insert molding.

It is contemplated that, with use, the splitter valve 200 will fill with water (or other liquid), which will remain within the fitting body 202 when the splitter valve 200 is no longer being used. In such instances, the ambient temperature around the splitter valve 200 may fall below freezing. Within a closed splitter valve 200 (where liquid is not entering or leaving the splitter valve 200) the pressure within the fitting body 202 will increase as the liquid expands. The deformably resilient nature of the expansion disc 220 allows a portion of the expansion disc 220 to expand outwardly from the fitting body 202 (as depicted in FIG. 5B) increasing a volume of the fluid pathway 210 from a base volume as a pressure within the fluid pathway increases from a base pressure. Accordingly, portions of the expanding, freezing liquid will fill the increased volume of the fluid pathway 210. Likewise, as the liquid melts, the expansion disc 220 contracts to a resting state (depicted in FIG. 5A) as the pressure within the fluid pathway 210 reduces toward the base pressure, reducing the volume of the fluid pathway 210 toward the base volume. It is contemplated that the expansion disc 220 could be formed from an elastomeric material that provides the desired level of deformable resiliency and structural integrity. In order to better accommodate the expansion of the expansion disc 220, the expansion nut 222 may be provided with an open central portion 224. The open central portion 224 is generally shaped to allow a portion of the expansion disc 220 to expand into, and at least partially through, the open central portion 224. In various embodiments, the expansion nut 222 is formed from a rigid material. In particular embodiments, the expansion nut 222 is formed from a metal, such as brass.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A hose fitting, comprising:
a fitting body, having an inlet opening, an expansion opening, an outlet opening, and an interior portion that defines a fluid pathway, which extends between and in fluid communication with the inlet opening, expansion opening, and the outlet opening;
an expansion disc, operatively coupled with the expansion opening, such that the expansion disc defines a portion of an exterior wall of the hose fitting;
the expansion disc being formed from a deformably resilient material such that, as a pressure within the fluid pathway increases from a base pressure, a portion of the expansion disc expands outwardly from the fitting body, increasing a volume of the fluid pathway from a base volume, wherein the expansion disc is removably coupled with the expansion opening; and
an expansion nut removably coupled with the expansion opening such that the expansion disc is secured between the expansion opening and the expansion nut, wherein the expansion nut has an open central portion that is shaped to allow a portion of the expansion disc to expand into and at least partially through the open central portion.

2. The hose fitting of claim 1, wherein:
the expansion disc contracts, as the pressure within the fluid pathway reduces toward the base pressure, reducing the volume of the fluid pathway toward the base volume.

3. The hose fitting of claim 1, wherein:
the expansion disc is formed from an elastomeric material.

4. The hose fitting of claim 1, wherein:
the fitting body is formed from a rigid material.

5. The hose fitting of claim 1, further comprising:
a valve, operatively coupled with the fitting body and disposed within the fluid pathway; the valve being movable between an open position that permits a fluid flow through the fluid pathway and a closed position that restricts the fluid flow through the fluid pathway.

6. The hose fitting of claim 5, wherein:
the valve is positioned adjacent the outlet opening to control the fluid flow through the outlet opening.

7. The hose fitting of claim 6, further comprising:
a second valve, operatively coupled with the fitting body and disposed within the fluid pathway; the second valve being movable between an open position that permits the fluid flow through the fluid pathway and a closed position that restricts the fluid flow through the fluid pathway; the second valve being positioned adjacent a second outlet opening to control the fluid flow through the second outlet opening.

8. The hose fitting of claim 1, further comprising:
a swivel connector that operatively couples an inlet portion of the fitting body with an outlet portion of the fitting body such that the outlet portion of the fitting body may be rotated with respect to the inlet portion of the fitting body.

9. The hose fitting of claim 8, wherein:
the expansion disc is formed from an elastomeric material that will expand outwardly from the expansion opening at pressures that are lower than a failure pressure rating of the swivel connector.

10. A hose fitting, comprising:
a fitting body, having an inlet opening, an expansion opening, an outlet opening, and an interior portion that defines a fluid pathway, which extends between and in fluid communication with the inlet opening, expansion opening, and the outlet opening;
an expansion disc, removably, operatively coupled with the expansion opening such that the expansion disc defines a portion of an exterior wall of the hose fitting;
the expansion disc being formed from an elastomeric material such that, as a pressure within the fluid pathway increases from a base pressure, a portion of the expansion disc expands outwardly from the fitting body, increasing a volume of the fluid pathway from a base volume, and the expansion disc contracts, as the pressure within the fluid pathway reduces toward the base pressure, reducing the volume of the fluid pathway toward the base volume; and
an expansion nut removably coupled with the expansion opening such that the expansion disc is secured between the expansion opening and the expansion nut; the expansion nut having an open central portion that penetrates opposite end portions of the expansion nut and is shaped to allow a portion of the expansion disc to expand into and at least partially through the open central portion so that at least a portion of the expansion disc extends out of the expansion nut.

11. The hose fitting of claim 10, wherein:
the expansion nut is removably coupled with the expansion opening with mating threads.

12. The hose fitting of claim 10, wherein:
the expansion nut is removably, press fit with the expansion opening.

13. The hose fitting of claim 10, further comprising:
a valve, operatively coupled with the fitting body and disposed within the fluid pathway; the valve being movable between an open position that permits a fluid flow through the fluid pathway and a closed position that restricts the fluid flow through the fluid pathway; the valve being positioned adjacent the outlet opening to control the fluid flow through the outlet opening.

14. The hose fitting of claim 13, further comprising:
a second valve, operatively coupled with the fitting body and disposed within the fluid pathway; the second valve being movable between an open position that permits the fluid flow through the fluid pathway and a closed position that restricts the fluid flow through the fluid pathway; the second valve being positioned adjacent a second outlet opening to control the fluid flow through the second outlet opening.

15. The hose fitting of claim 10, further comprising:
a swivel connector that operatively couples an inlet portion of the fitting body with an outlet portion of the fitting body such that the outlet portion of the fitting body may be rotated with respect to the inlet portion of the fitting body; the expansion disc being formed from an elastomeric material that will expand outwardly from the expansion opening at pressures that are lower than a failure pressure rating of the swivel connector.

* * * * *